United States Patent
Kitahara et al.

(10) Patent No.: US 7,228,734 B2
(45) Date of Patent: Jun. 12, 2007

(54) AIR FLOW RATE MEASURING DEVICE HAVING SENSING UNIT

(75) Inventors: Noboru Kitahara, Hekinan (JP); Hideki Matsuura, Kariya (JP); Yasushi Goka, Kariya (JP)

(73) Assignee: DENSO Corporation (JP)

( * ) Notice: Subject to any disclaimer, the term of this patent is extended or adjusted under 35 U.S.C. 154(b) by 68 days.

(21) Appl. No.: 11/108,753

(22) Filed: Apr. 19, 2005

(65) Prior Publication Data

US 2005/0241389 A1    Nov. 3, 2005

(30) Foreign Application Priority Data

Apr. 28, 2004   (JP)   ............... 2004-133856

(51) Int. Cl.
*G01F 1/68* (2006.01)

(52) U.S. Cl. .................................... 73/202.5

(58) Field of Classification Search ............ 73/204.21, 73/202.5, 861.52, 204.22, 202
See application file for complete search history.

(56) References Cited

U.S. PATENT DOCUMENTS

| | | | |
|---|---|---|---|
| 5,804,718 A | 9/1998 | Nagasaka et al. | 73/202 |
| 6,223,594 B1 * | 5/2001 | Takiguchi et al. | 73/204.21 |
| 6,526,822 B1 * | 3/2003 | Maeda et al. | 73/204.21 |
| 6,619,140 B2 * | 9/2003 | Kitahara et al. | 73/861.52 |
| 2003/0046996 A1 | 3/2003 | Nakada et al. | 73/202.5 |
| 2004/0003659 A1 | 1/2004 | Kato et al. | 73/202 |
| 2005/0252289 A1 | 11/2005 | Kitahara et al. | |

FOREIGN PATENT DOCUMENTS

JP   11-23336   1/1999

OTHER PUBLICATIONS

US Serial No. (not yet assigned); filed Apr. 19, 2005; Client Ref: 82749-US-SHM/cy; Inventors: Noboru Kitahara et al.; Claims priority of JP 2004-133756 filed Apr. 28, 2004.

* cited by examiner

*Primary Examiner*—Jewel Thompson
(74) *Attorney, Agent, or Firm*—Nixon & Vanderhye PC

(57) ABSTRACT

A sensing unit is constructed of a heater element and a temperature sensing element. The sensing unit is arranged in a region, in which measurement air, which flows into the inflow passage through the bypass inlet, bends at the substantially right-angle and contracts in flow. Alternatively, the sensing unit is arranged in a region immediately after an area, in which the measurement air flowing through the bypass inlet bends at the substantially right-angle. The lengthwise directions of the heater element and the temperature sensing element are respectively arranged to be in parallel with both thickness-wise side faces of the measurement body. Thereby, even when a flow rate of measurement air changes, an influence due to the change can be restricted from being exerted. Therefore, the maximum flow rate can be measured within the lengthwise range of the heater element from a low flow rate to a high flow rate.

13 Claims, 7 Drawing Sheets

AIR FLOW RATE MEASURING DEVICE HAVING SENSING UNIT

CROSS REFERENCE TO RELATED APPLICATIONS

This application is based on and incorporates herein by reference Japanese Patent Application No. 2004-133856 filed on Apr. 28, 2004.

FIELD OF THE INVENTION

The present invention relates to an air flow rate measuring device having an air passage in which a bypass passage is formed, and a sensing unit arranged in the bypass passage for measurement of an air flow rate.

BACKGROUND OF THE INVENTION

An air flow rate measuring device disclosed in JP-A-9-287985 measures an intake amount of air flowing in an internal combustion engine. As shown in FIGS. 11A, B, the air flow rate measuring device includes a bypass passage 100, through which intake air partially flows. The air flow rate measuring device includes a sensing unit in the bypass passage 100.

The bypass passage 100 has an inlet 110, which opens in a direction opposite to a flow direction of intake air. Besides, as shown by an arrow in FIG. 11B, the bypass passage 100 is in a shape, in which air flowing from the inlet 110 turns at a substantially right angle. A bent portion is provided midway the bypass passage 100. The bent portion changes air in flow direction. A passage on the upstream side with respect to the bent portion is partitioned by a partition 120 from a passage on the downstream side with respect to the bent portion.

The sensing unit includes a heater element 130 to measure a flow rate of air. The heater element 130 is arranged in the passage on the upstream side relative to the bent portion of the bypass passage 100. However, as shown in FIG. 11A, the heater element 130 is arranged in a direction such that the lengthwise direction of the heater element 130 becomes perpendicular to both side faces forming the bypass passage 100. Here, both the side faces are perpendicular to the flow direction of air. The heater element 130 is arranged lengthwise in the horizontal direction in FIG. 11A. As referred to FIG. 11B, the heater element 130 is arranged in a position, which is biased, i.e., displaced to the side of the partition 120 with respect to the center in the bypass passage 100.

In the above air flow rate measuring device, air flowing from the inlet 110 bends at a substantially right angle in flow direction. Therefore, as shown in FIG. 12B, as flow velocity of air flowing into the bypass passage 100 becomes high, the maximum flow velocity is biased to the side of the partition wall 120 in a flow velocity distribution X shown by the solid line in the passage on the upstream side of the bent portion. That is, flow velocity of air is stabilized while being biased to the side of the partition 120 relative to the center of the passage on the upstream side with respect to the bent portion. Therefore, the heater element 130 is arranged in a position, which is biased to the side of the partition 120 with respect to the center pf the passage, so that measurement accuracy is enhanced.

The above conventional structure is effective when an intake amount of air is large, i.e., a flow velocity of air is high. However, as shown in FIG. 12A, the flow velocity distribution X is formed around the center of the bypass passage 100 on the upstream side of the bent portion in a low flow rate condition, in which an intake amount of air is small.

Accordingly, when a flow rate is low, the flow velocity distribution X becomes in a parabolic shape in the bypass passage 100. Accordingly, when the heater element 130 is arranged in a position eccentrically biased to the side of the partition 120, a flow rate is measured in a region, in which flow velocity is low in the flow velocity distribution X. As a result, measurement accuracy is degraded when a flow rate is low, and a dynamic range of flow measurement becomes small.

SUMMARY OF THE INVENTION

In view of the foregoing problems, it is an object of the present invention to provide an air flow rate measuring device that is capable of enhancing measurement accuracy regardless of a flow rate of air and is capable of enlarging a dynamic range in flow measurement.

According to the present invention, an air flow rate measuring device includes a bypass passage and a heater element. Air flowing in an air passage is capable of partially flowing through the bypass passage. The heater element is arranged in the bypass passage. The heater element measures an air flow rate on the basis of a quantity of heat, which is radiated to air. The bypass passage defines an inlet, an inflow passage, and an outflow passage. The inlet opens in a direction that is opposite to a flow direction of air flowing through the air passage such that air flowing through the inlet bends to be in a predetermined flow direction and flows into the inflow passage. The outflow passage connects to the inflow passage via a bent portion, in which air flowing from the inflow passage further changes in flow direction. The heater element is arranged in the inflow passage. The heater element is arranged such that a lengthwise direction of the heater element is substantially in parallel with a flow direction of air flowing through the air passage.

The heater element is arranged in a region, in which air, which flows from the inlet and bends to be in the predetermined flow direction, contracts in flow. The heater element is arranged in a region immediately after an area, in which air flowing from the inlet bends to be in the predetermined flow direction.

The air flow rate measuring device further includes a throttle portion. The throttle portion is provided to a side face of the inflow passage. The side face of the inflow passage is perpendicular to the lengthwise direction of the heater element. The throttle portion gradually reduces the inflow passage in cross section from an upstream of a region, in which the heater element is arranged, toward the region, in which the heater element is arranged.

The bent portion defines an inside path, in which air flowing from the inlet bends to be in the predetermined flow direction into the inflow passage while decreasing in flow velocity, on an inside within the bent portion. The bent portion defines an outside path, in which air flowing from the inlet bends to be in the predetermined flow direction into the inflow passage while increasing in flow velocity, on an outside within the bent portion. The throttle portion has one end side thereof. The one end side of the throttle portion is arranged on an extension of the inside path. The throttle portion has the other end side thereof. The other end side of the throttle portion is arranged on an extension of the outside path. The throttle portion on the outside path is lower than the throttle portion on the inside path in height."

The throttle portion is in a tapered shape that decreases in height from the one end side toward the other end side. The throttle portion is in an R shape that decreases in height from the one end side toward the other end side. The throttle portion stepwisely decreases in height from the one end side toward the other end side.

Thereby, the an air flow rate measuring device is capable of enhancing measurement accuracy, and is capable of enlarging a dynamic range in flow measurement, regardless of variation in flow rate.

BRIEF DESCRIPTION OF THE DRAWINGS

The above and other objects, features and advantages of the present invention will become more apparent from the following detailed description made with reference to the accompanying drawings. In the drawings:

FIG. 11A is a cross sectional view showing an air flowmeter when being viewed from the transverse direction, and FIG. 11B is a cross sectional view showing the air flowmeter when being viewed from the thickness-wise direction, according to a prior art.

DETAILED DESCRIPTION OF PREFERRED EMBODIMENTS

First Embodiment

Figure 1A:
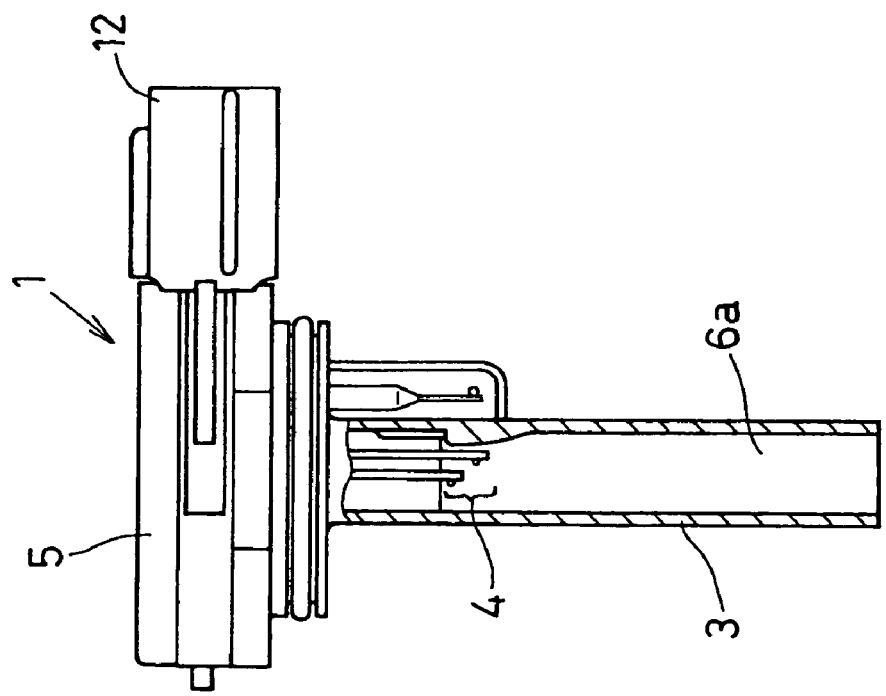
FIG. 1A is a cross sectional view showing an air flowmeter when being viewed from the transverse direction.
Figure 1B:
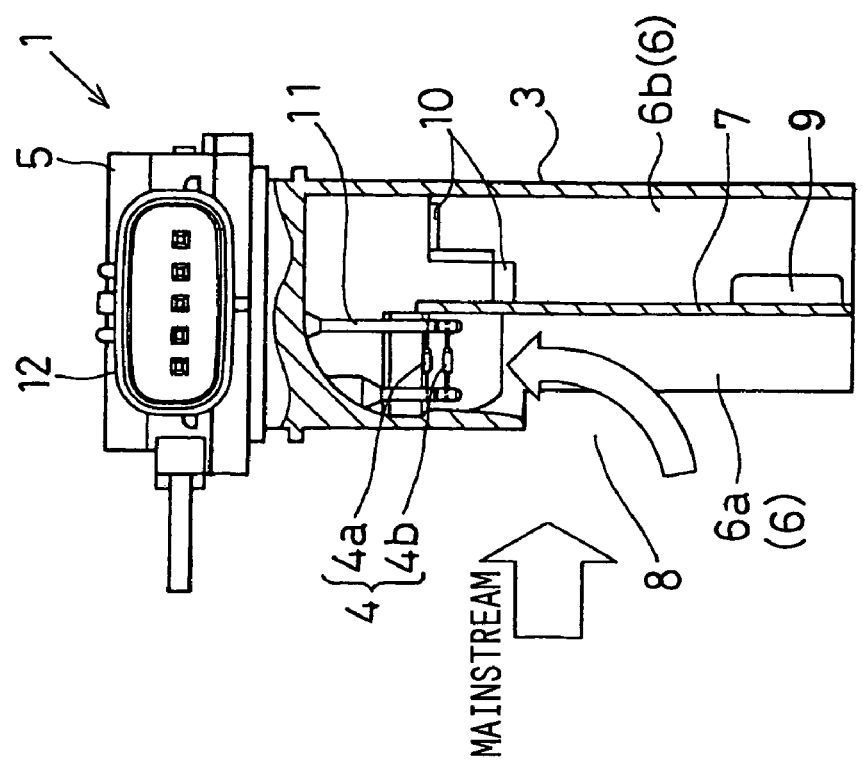
FIG. 1B is a cross sectional view showing the air flowmeter when being viewed from the thickness-wise direction according to a first embodiment of the present invention.
Figure 3:
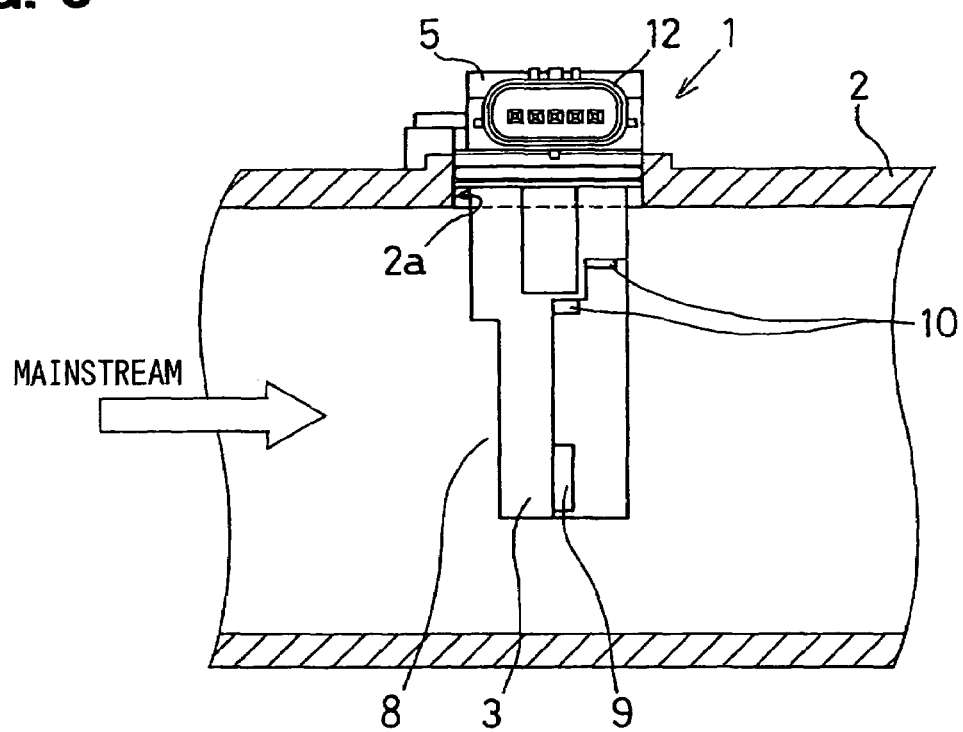
FIG. 3 is a cross sectional view showing the air flowmeter mounted to an intake duct according to the first embodiment.

As shown in FIGS. 1A, 1B, an air flow rate measuring device serves as an air flowmeter 1 that measures a flow rate of intake air of an internal combustion engine. As shown in FIG. 3, the air flowmeter 1 is mounted to an intake duct 2 that internally forms an air passage. The air flowmeter 1 is constructed of a measurement body 3, a sensing unit 4, a circuit module 5, and the like.

The measurement body 3 is inserted into an interior of the intake duct 2 through a mount hole 2a formed in the intake duct 2. The measurement body 3, which is inserted through mount hole 2a, is exposed to air flowing through the intake duct 2.

The measurement body 3 is formed in a flat shape that has the thickness in the thickness-wise direction shown in FIG. 1A. The thickness of the measurement body 3 shown in FIG. 1A is smaller than the width of the measurement body 3 in the transverse direction shown in FIG. 1B. The transverse direction of the measurement body 3 is arranged along the direction of air flowing through the intake duct 2 (FIG. 3). Here, air flowing through the intake duct 2 is referred to as mainstream, and flow of the mainstream is referred to as mainstream flow.

As referred to FIGS. 1A, 1B, a bypass passage 6 is formed within the measurement body 3, through which the mainstream flow partially flows as measurement air. As referred to FIG. 1B, the bypass passage 6 is formed with a U-turn portion (bent portion), which has a U-shape, i.e., an inverted U-shape in FIG. 1B including a partition 7, along which flow of measurement air is turned at 180 degrees. An inflow passage 6a is formed in the bypass passage 6 along the radial direction of the intake duct 2 on the upstream side of the U-turn portion. An outflow passage 6b is formed in the bypass passage 6 along the radial direction of the intake duct 2 on the downstream side of the U-turn portion.

Besides, a bypass inlet 8, through which the measurement air flows into the bypass passage 6, is formed in the measurement body 3. Bypass outlets 9, 10, through which the measurement air flows out of the bypass passage 6, are formed in the measurement body 3.

As referred to FIG. 1B, the bypass inlet 8 widely opens to extend from a front surface of the measurement body 3, which faces the mainstream flow, to a bottom surface of the measurement body 3. Accordingly, the measurement air inflowing from the bypass inlet 8 turns at a substantially right angle with respect to the bypass inlet 8, so that the measurement air flows through the inflow passage 6a, as indicated by the arrow in FIG. 1B.

The bypass outlets 9, 10 include a main outlet 9, which opens to a downstream end of the bypass passage 6, and a sub-outlet 10 arranged between the U-turn portion of the bypass passage 6 and the main outlet 9.

The sensing unit 4 includes a heater element 4a, which measures an air flow rate, and a temperature sensing element 4b for temperature compensation. The respective elements 4a, 4b are connected to a substrate (not shown), which is accommodated in the circuit module 5, via a terminal 11.

The sensing unit 4 is arranged on the upstream side of the U-turn portion in the bypass passage 6. That is, the sensing unit 4 is arranged inside the inflow passage 6a. Specifically, the sensing unit 4 is arranged in a region, in which the measurement air, which flows from the bypass inlet 8 into the inflow passage 6a, contracts in flow when the flow of the measurement air turns at the substantially right-angle. Alternatively, the sensing unit 4 may be arranged in a region immediately after the measurement air turns at the substantially right-angle with respect to the bypass inlet 8.

Besides, the heater element 4a and the temperature sensing element 4b, are electrically connected at both longitudinal ends respectively to the terminal 11. The heater element 4a and the temperature sensing element 4b are oriented lengthwise in a direction substantially in parallel with the mainstream flow (FIG. 3) that passes through the intake duct 2 as referred to FIG. 1B. That is, the lengthwise directions of the heater element 4a and the temperature sensing element 4b are respectively arranged to be in parallel with both thickness-wise side faces of the measurement body 3.

Figure 2A:
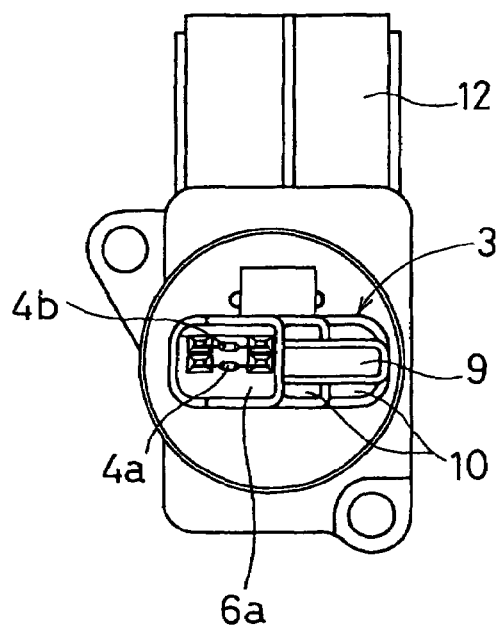
FIG. 2A is a plan view showing the air flowmeter when being viewed from the bottom side.
Figure 2B:
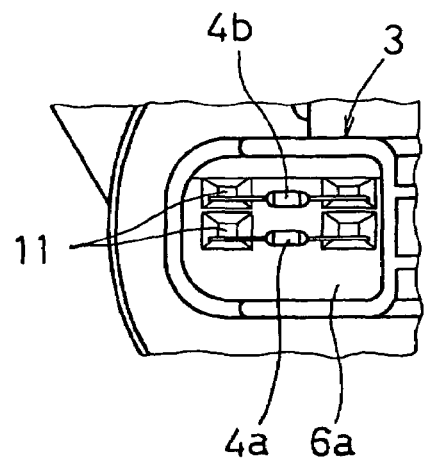
FIG. 2B is an enlarged view showing an arrangement of the sensing unit within the inflow passage according to the first embodiment.

As show in FIGS. 2A, 2B, the heater element 4a and the temperature sensing element 4b are arranged such that the centers of the heater element 4a and the temperature sensing element 4b with respect to the lengthwise directions thereof are positioned at the substantially center in the inflow passage 6a. Here, the lengthwise directions of the heater element 4a and the temperature sensing element 4b are substantially in parallel with the horizontal direction in FIGS. 2A, 2B.

The circuit module 5 is provided integrally with a top of the measurement body 3, and is arranged outside the intake duct 2 as referred to FIG. 3. The circuit module 5 controls an electric current, which flows to the heater element 4a, in a manner to maintain a temperature difference, which is between heating temperature of the heater element 4a and temperature of intake air detected by the temperature sensing element 4b, constant. Besides, the circuit module 5 is connected to an ECU (electronic control unit, not shown) via a wire harness (not shown), so that the circuit module 5 outputs a voltage signal to the ECU. The voltage signal is proportional to an electric current, which flows through the heater element 4a. The ECU measures an intake air flow rate on the basis of a voltage signal, which is output from the circuit module 5. In addition, a connector 12 (FIGS. 1A, 1B) for connection of the wire harness is integrally molded on the side of the circuit module 5.

Figure 4A:
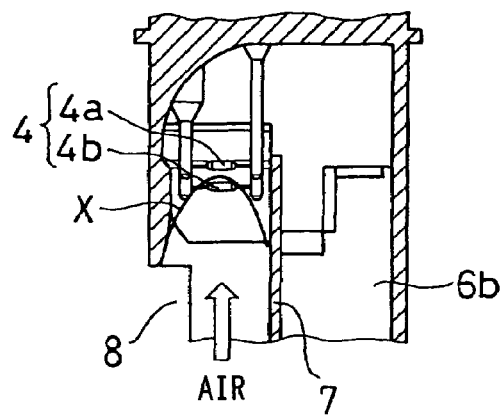
FIGS. 4A, 4B are cross sectional views showing flow velocity distributions according to the first embodiment.
Figure 4B:
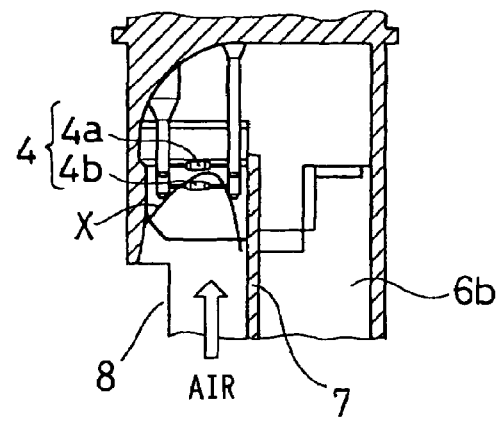

In the air flowmeter 1 with the above structure, the measurement air inflows through the bypass inlet 8, and turns at the substantially right-angle, so that the measurement air flows through the inflow passage 6a. Accordingly, as a flow rate of the measurement air increases, the maximum flow velocity of the measurement air is biased, i.e., displaced to the side of the partition 7 in a flow velocity distribution within the inflow passage 6a. In the above structure, the heater element 4a is arranged lengthwise to be substantially in parallel with the main stream flow. Therefore, even when a flow rate of the measurement air changes, an influence due to the change of a flow rate of the measurement air can be hardly exerted upon the heater element 4a in measurement of a flow rate. That is, as shown in FIG. 4B, when a flow rate is high, a flow velocity distribution X is generated such that the maximum flow rate thereof is biased to the outer side of air flow, which enters from the bypass inlet 8 and bends at substantially right-angle. However, the lengthwise direction of the heater element 4a is substantially in parallel with the main stream flow, so that the maximum flow rate can be measured within the lengthwise range of the heater element 4a.

Figure 11B:
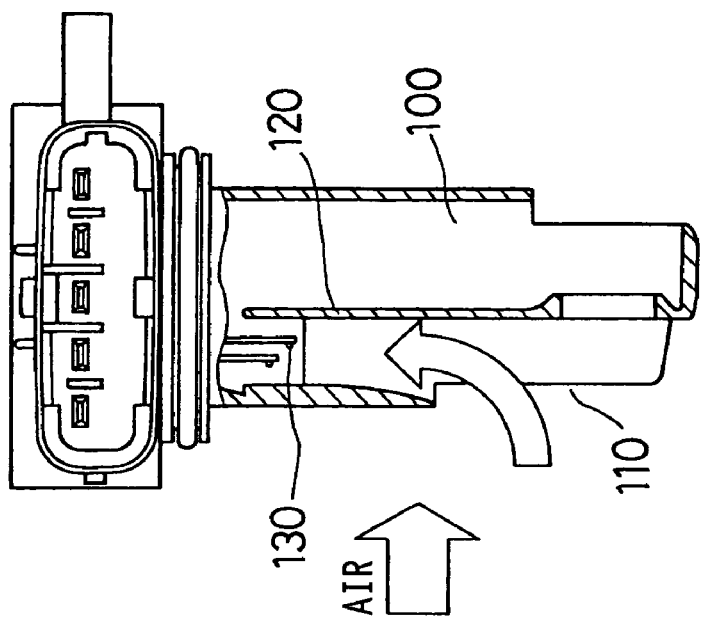
FIG. 11B is a cross sectional view showing the air flowmeter with respect to the transverse direction
Figure 11A:
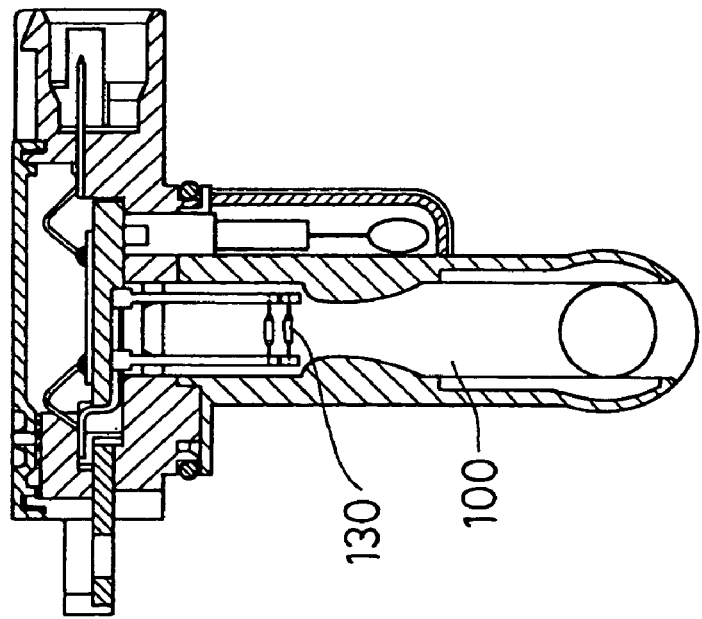
FIG. 11A is a cross sectional view showing an air flowmeter with respect to the thickness-wise direction.

On the contrary, when a flow rate is low, the maximum flow rate is not biased to the outer side of air flow, i.e., to the side of the partition 7. As shown in FIG. 4A, the flow velocity distribution X is formed around the center of the inflow passage 6a, when a flow rate is low. Thereby, the maximum flow rate can be measured throughout the length of the heater element 4a, similarly to the case, in which a flow rate is high. As shown in FIGS. 11A, 11B, the conventional flowmeter has the structure, in which the heater element 130 is arranged lengthwise to be substantially perpendicular with respect to both sidewalls constructing the bypass passage 100. Here, both the sidewalls of the bypass passage 100 are arranged substantially in parallel with the mainstream flow.

Figure 5:
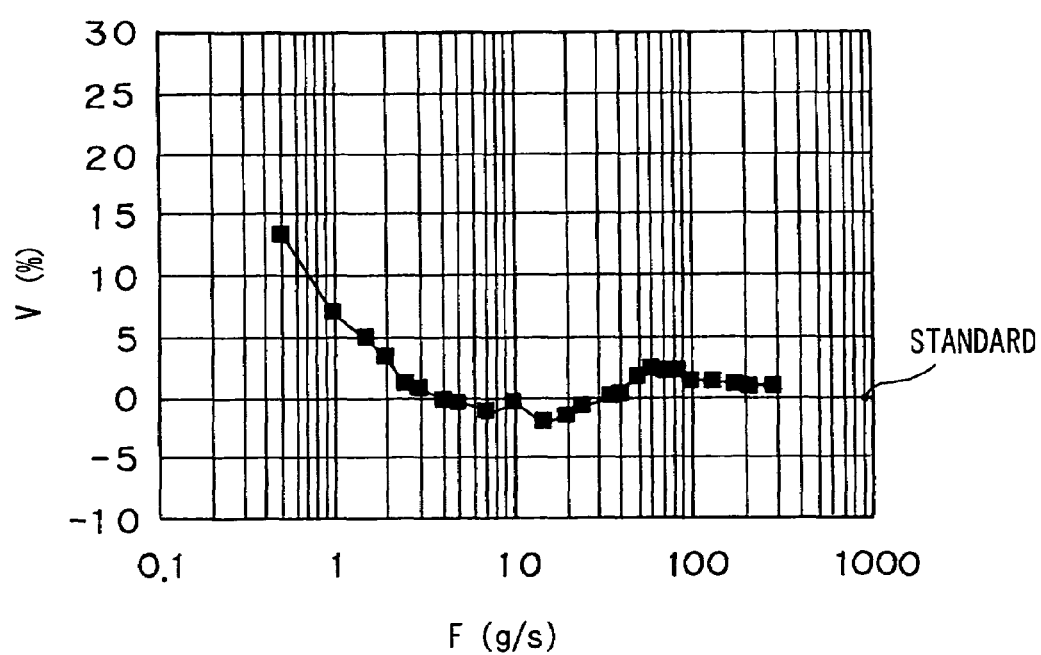
FIG. 5 is a graph showing a rate of variation in flow velocity relative to a standard of a conventional air flowmeter according to the first embodiment.

Here, FIG. 5 is a measurement result showing a relationship between a rate V of variation in flow velocity, when a flow rate F of air changes in the air flowmeter 1 described in first embodiment, being compared with a flow rate of air in the conventional flowmeter as a standard. That is, the standard position of 0 (%) in the vertical axis shown in FIG. 5 is equivalent to a flow velocity of the conventional flowmeter. The rate V of variation in flow velocity shows a rate between a flow velocity of the air flowmeter 1 described in the first embodiment and a flow velocity of the conventional flowmeter, when a flow rate F of air changes. As shown in FIG. 5, as a flow rate decreases, flow velocity of the air flowmeter 1 described in the first embodiment becomes large compared with flow velocity of the conventional flowmeter. That is, flow velocity in the air flowmeter 1 according to the first embodiment increases in a range, in which a flow rate is low, compared with flow velocity in the conventional flowmeter. Therefore, measurement accuracy is enhanced in the air flowmeter 1 compared with the conventional structure of the air flowmeter. Thereby, a dynamic range of flow measurement can be enlarged.

Additionally, in the first embodiment, the heater element 4a is arranged in the region, in which the measurement air, which flows into the inflow passage 6a through the bypass inlet 8, bends at the substantially right-angle, and the measurement air contracts in flow. Alternatively, the heater element 4a is arranged in a region immediately after an area, in which the measurement air flowing through the bypass inlet 8 bends at the substantially right-angle. Thereby, a flow rate of air can be measured in a condition, in which the measurement air is restricted from being turbulence, so that measurement accuracy can be enhanced.

Second Embodiment

Figure 6A:
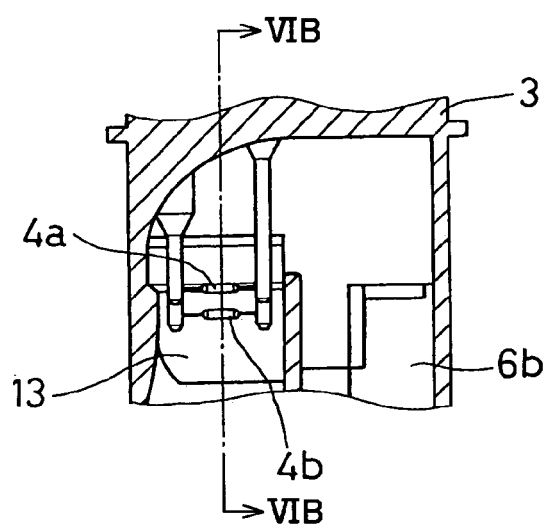
FIG. 6A is a cross sectional view showing an inflow passage, in which a sensing unit is provided.
Figure 6B:
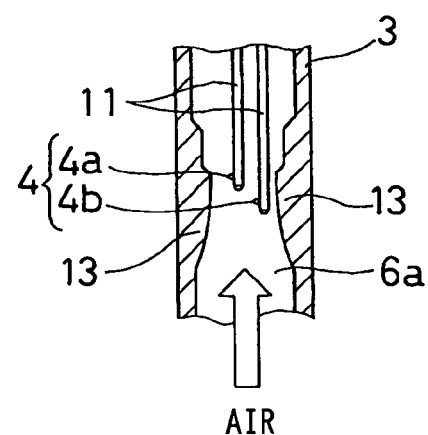
FIG. 6B is a cross sectional view showing a throttle portion in the inflow passage taken along the line A-A in FIG. 6A, according to a second embodiment of the present invention.

As shown in FIGS. 6A, 6B, the second embodiment shows an example, in which the throttle portion 13 is provided to the air flowmeter 1 described in the first embodiment. The throttle portion 13 is provided to the inner surfaces of the air flowmeter 1 on both sides with respect to a direction perpendicular to the lengthwise directions of the heater element 4a and the temperature sensing element 4b. That is, the throttle portion 13 is provided to the inner surfaces of the air flowmeter 1 on both sides with respect to the thickness-wise direction of the measurement body 3. The thickness-wise direction of the measurement body 3 is equivalent to the horizontal direction in FIG. 6B. The throttle portion 13 gradually reduces the passage in cross section from the upstream of the region, in which the sensing unit 4 is arranged, toward the region, in which the sensing unit 4 is arranged.

The measurement air flows from the bypass inlet 8, and bends at the substantially right-angle. Subsequently, the measurement air is oriented in flow direction through the throttle portion 13, so that flow of the measurement air is stabilized. That is, turbulence of the measurement air is restricted. Thereby, measurement accuracy can be enhanced.

Furthermore, air flowing in directions excluding the lengthwise direction of the sensing unit 4 can be oriented in flow direction, so that airflow can be stabilized. Thus, measurement accuracy can be enhanced.

Figure 7A:
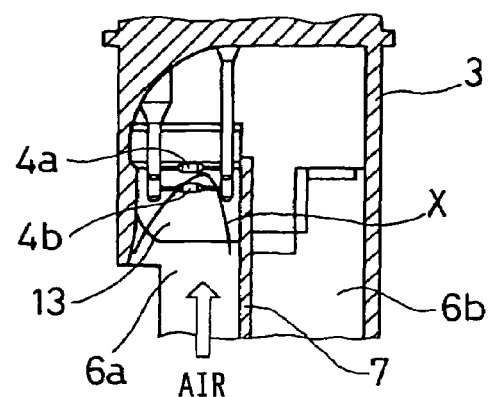
FIG. 7A is a cross sectional view showing an inflow passage, in which the sensing unit is provided.
Figure 7B:
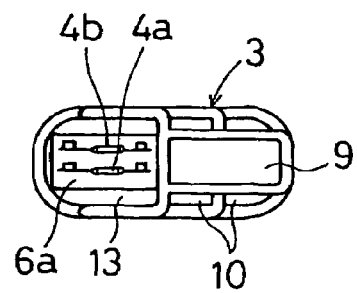
FIG. 7B is a plan view showing a measurement body when being viewed from the bottom side according to a related art.

However, as shown in FIG. 7B, when the throttle portion 13 is constant in height throughout the lengthwise direction of the heater element 4a, the following problem may arise.

That is, in the air flowmeter described in the first embodiment, the measurement air flows from the bypass inlet 8, and bends at the substantially right-angle, subsequently, the measurement air flows into the inflow passage 6a. Accordingly, as shown in FIG. 7A, as a flow rate of the measurement air increases, the maximum flow velocity is biased to the side of the partition 7 in the flow velocity distribution X, similarly to the first embodiment. In this case, when the heater element 4a is misaligned with respect to the lengthwise direction of the heater element 4a, a flow rate may not be measured at the position, in which the flow velocity is maximum in the flow velocity distribution X.

The throttle portion 13 is varied in height along the lengthwise direction of the heater element 4a, so that dispersion in performance of the air flowmeter 1 can be restricted, even when the position, in which the heater element 4a is assembled, varies. In particular, dispersion in performance of the air flowmeter 1 can be restricted, even when the position, in which the heater element 4a is assembled, varies lengthwise relative to the position, in which the heater element 4a is connected to the terminal 11. The measurement air, which flows from the bypass inlet 8 and flows into the inflow passage 6a after bending at the substantially right-angle, decreases in flow velocity inside of the bend, and increases in flow velocity outside of the bend. Here, the inside of the bend is referred as an inside path, and the outside of the bend is referred as an outside path. As shown in FIG. 8B, the throttle portion 13 is in a tapered shape that varies in height from one end side of the throttle portion 13, which is arranged on the extension of the inside path, toward the other end side of the throttle portion 13, which is arranged on the extension of the outside path, for example. The one end side of the throttle portion 13 is on the side opposite to the partition 7. The other end side of the throttle portion 13 is on the side of the partition 7.

Figure 8A:
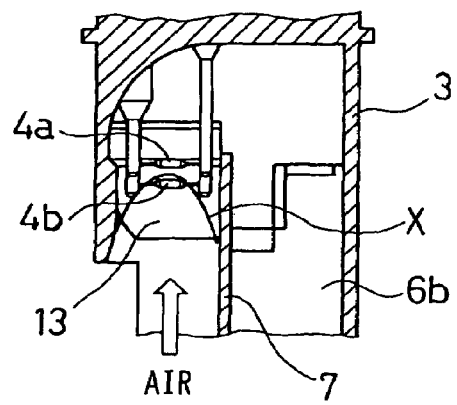
FIG. 8A is a cross sectional view showing an inflow passage, in which the sensing unit is provided.
Figure 8B:
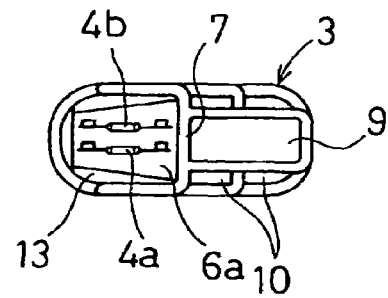
FIG. 8B is a plan view showing a measurement body when being viewed from the bottom side, according to the second embodiment.
Figure 9:
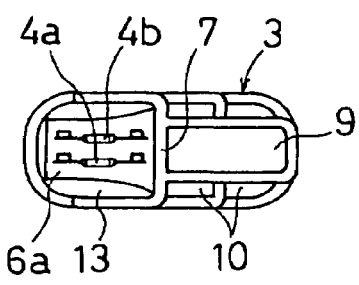
FIG. 9 is a plan view showing the measurement body when being viewed from the bottom side, according to the second embodiment.
Figure 10:
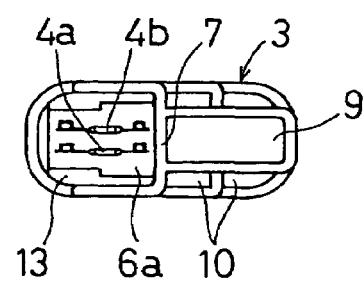
FIG. 10 is a plan view showing the measurement body when being viewed from the bottom side, according to the second embodiment.
Figure 12A:
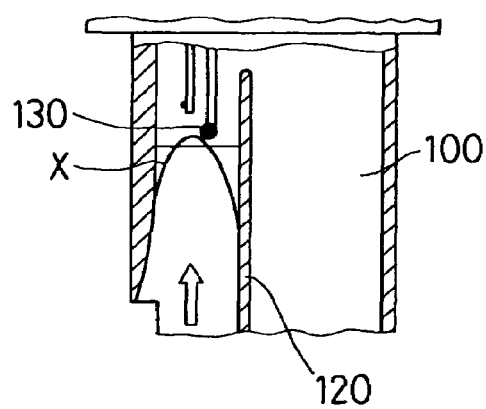
FIGS. 12A, 12B are cross sectional views showing flow velocity distributions, according to the prior art.
Figure 12B:
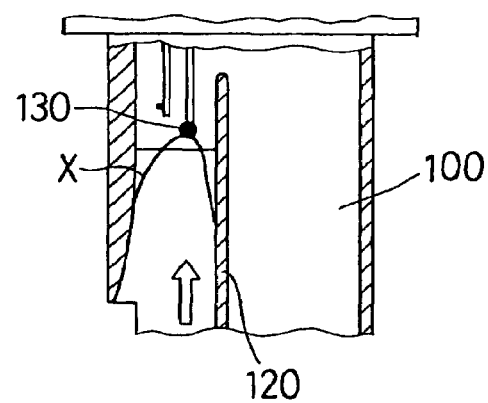

With this structure, as shown in FIG. 8A, the flow velocity distribution X is formed in a radial shape within the inflow passage 6a, and dispersion in the maximum flow velocity is restricted. Thereby, dispersion in performance of the air flowmeter 1 can be restricted, even when the position, to which the heater element 4a is assembled, varies. As shown in FIG. 9, the throttle portion 13 may be formed in an R-shape, i.e., in a round shape. That is, the throttle portion 13 gradually decreases in height from the side opposite to the partition 7 toward the side of the partition 7 while curving in the outer periphery thereof, as well as the tapered shape shown in FIG. 8B, for example. Alternatively, as shown in FIG. 10, the throttle portion 13 may be formed such that the throttle portion 13 stepwisely decreases in height from the side opposite to the partition 7 toward the side of the partition 7.

In the above examples shown in FIGS. 7A to 10, the components of the throttle portion 13 are provided on both sides with respect to the direction perpendicular to the lengthwise directions of the heater element 4a and the temperature sensing element 4b. However, the throttle portion 13 may be provided to at least one end side in the bypass passage 6.

With the above structures of an air flow rate measuring device (air flow meter) 1, the lengthwise direction of the heater element 4a is arranged in a direction, in which flow velocity of air is distributed in the inflow passage 6a. In the inflow passage 6a, a region, in which flow velocity of air becomes high, and a region, in which flow velocity of air becomes low, are distributed. Thereby, even when distribution of flow velocity changes in the inflow passage 6a due to variation of a flow rate of air flowing through the air passage (intake duct) 2, an influence, which is caused by change in distribution of flow velocity, can be restricted from exerting to measurement of a flow rate. That is, when a flow rate is high, the maximum flow velocity is biased to the outside of the airflow, which bends in a predetermined direction relative to the inlet (bypass inlet) 8, in a flow velocity distribution. However, in the above structure, the heater element 4a is arranged in a direction, in which flow velocity of air is distributed in the inflow passage 6a, i.e., the heater element 4a is arranged substantially along the flow direction of mainstream flow. Thereby, airflow at the maximum flow velocity can be measured within the range in the lengthwise direction of the heater element 4a.

When a flow rate is low, airflow at the maximum flow velocity is not biased to the outside of the airflow, and a flow velocity distribution is formed around the center of the inflow passage 6a. Thereby, airflow at the maximum flow velocity can be measured within the lengthwise direction of the heater element 4a, similarly to the situation, in which a flow rate is high.

In the above structure, the heater element 4a is arranged in a region, in which air contracts in flow after flowing from the inlet 8 and bending in a predetermined direction.

Air, which flows through the inflow passage 6a, enters from the inlet 8, and bends in a predetermined direction. The airflow contracts due to inertial force generated in the airflow. Subsequently, secondary flow is generated, and drift due to bending is recovered, so that flow expands. In this situation, airflow becomes turbulence in a region, in which airflow expands. Accordingly, when the heater element 4a is arranged in the region, in which airflow expands, measurement accuracy is deteriorated. On the contrary, airflow is oriented and stabilized to be in order in the region, in which airflow contracts. Thereby, the heater element 4a is arranged in the region, in which airflow contracts, so that measurement accuracy can be improved.

In the above structure, the heater element 4a is arranged in the region immediately after an area, in which air flowing from the inlet 8 bends in flow direction to be in a predetermined direction.

Inertial force is generated in airflow in the region immediately after the area, in which airflow turns to be in a predetermined direction, so that airflow contracts. The heater element 4a is arranged in the region immediately after the area, in which airflow turns to be in the predetermined direction, so that measurement accuracy can be enhanced.

In the above structure, the air flow rate measuring device 1 includes the throttle portion 13. The throttle portion 13 is provided to the side face of the inflow passage 6a. The side face of the inflow passage 6a is substantially perpendicular to the lengthwise direction of the heater element 4a. That is, the side face of the inflow passage 6a is substantially in parallel with the flow direction of mainstream flow in the air passage 2. The throttle portion 13 gradually reduces the inflow passage 6a in cross section from the upstream of a region, in which the heater element 4a is arranged, toward the region, in which the heater element 4a is arranged.

With this structure, airflow is conditioned, i.e., oriented in direction, when air, which flows from the inlet 8 and changes the flow direction thereof to be in the predetermined direction, passes through the throttle portion 13. Thereby, airflow is stabilized, so that measurement accuracy can be enhanced.

Furthermore, air flowing in directions excluding the lengthwise direction of the heater element 4a can be oriented in flow direction, so that airflow can be stabilized. Thus, measurement accuracy can be enhanced.

In the above structure, the bent portion internally forms an inside path, in which airflow entering from the inlet 8 turns to be in a predetermined direction into the inflow passage 6a while decreasing in flow velocity, on the inside in the bent portion. Besides, the bent portion internally forms an outside path, in which airflow entering from the inlet 8 turns to be in the predetermined direction into the inflow passage 6a while increasing in flow velocity, on the outside in the bent portion. The throttle portion 13 has one end side thereof. The one end side of the throttle portion 13 is arranged on an extension of the inside path. The throttle portion 13 has the other end side thereof. The other end side of the throttle portion 13 is arranged on an extension of the outside path. The throttle portion 13 on the outside path is lower than the throttle portion 13 on the inside path in height. That is, the flow passage in the throttle portion 13 on the side of the outside path is wider than the flow passage in the throttle portion 13 on the side of the inside path in cross section, as shown in FIGS. 8B, 9, 10.

With this structure, the width of the flow passage on the other end side, i.e., on the side of the outside path is larger than the width of the flow passage on the one end side, i.e., on the side of the inside path in the throttle portion 13. Thereby, flow velocity distribution is uniformed in the inflow passage 6a, so that deviation can be restricted in flow velocity distribution. As a result, the air flow rate measuring device 1 can be restricted from being varied in performance, even when a position, to which the heater element 4a is assembled, varies.

In the air flow rate measuring device 1, the throttle portion 13 is in a tapered shape that decreases in height from the one end side toward the other end side. Alternatively, the throttle portion 13 is in the R shape that decreases in height from the one end side toward the other end side. Alternatively, the throttle portion 13 stepwisely decreases in height from the one end side toward the other end side. That is, the throttle portion 13 decreases in height with respect to the thickness direction of the measurement body 3 from the one end side, i.e., on the side of the inside path toward the other end side, i.e., on the side of the outside path.

Thereby, the air flow rate measuring device 1 can be restricted from being varied in performance, even when a position, to which the heater element 4a is assembled, varies.

The structures of the above embodiments can be combined as appropriate.

Various modifications and alternations may be diversely made to the above embodiments without departing from the spirit of the present invention.

What is claimed is:

1. An air flow rate measuring device comprising:
a bypass passage through which air flowing in an air passage is capable of partially flowing; and
a heater element that is arranged in the bypass passage, the heater element measuring an air flow rate on the basis of a quantity of heat, which is radiated to air,
wherein the bypass passage defines an inlet, an inflow passage, and an outflow passage,
the inlet opens in a direction that is opposite to a flow direction of air flowing through the air passage such that air flowing through the inlet bends to be in a predetermined flow direction and flows into the inflow passage,
the outflow passage connects to the inflow passage via a bent portion in which air flowing from the inflow passage further changes in flow direction,
the heater element is arranged in the inflow passage,
the heater element is arranged such that a lengthwise direction of the heater element is substantially in parallel with a flow direction of air flowing through the air passage,
the heater element has an element length in a longitudinal direction of the heater element,
air flowing through the inflow passage defines a flow velocity distribution having a peak, which is located in a range of the element length substantially throughout a measurement range of the air flow rate,
the heater element has a center portion with respect to the longitudinal direction, and
the center portion is in the vicinity of the peak of the flow velocity distribution when the air flow rate is low.

2. The air flow rate measuring device according to claim 1, wherein the heater element is arranged in a region, in which air, which flows from the inlet and bends to be in the predetermined flow direction, contracts in flow.

3. The air flow rate measuring device according to claim 1, wherein the heater element is arranged in a region immediately after an area, in which air flowing from the inlet bends to be in the predetermined flow direction.

4. The air flow rate measuring device according to claim 1, further comprising:
a throttle portion that is provided to a side face of the inflow passage, the side face of the inflow passage being perpendicular to the lengthwise direction of the heater element,
wherein the throttle portion gradually reduces the inflow passage in cross section from an upstream of a region, in which the heater element is arranged, toward the region, in which the heater element is arranged.

5. The air flow rate measuring device according to claim 4,
wherein the bent portion defines an inside path, in which air flowing from the inlet bends to be in the predetermined flow direction into the inflow passage while decreasing in flow velocity, on an inside within the bent portion,
the bent portion defines an outside path, in which air flowing from the inlet bends to be in the predetermined flow direction into the inflow passage while increasing in flow velocity, on an outside within the bent portion,
the throttle portion has one end side thereof, the one end side of the throttle portion is arranged on an extension of the inside path,
the throttle portion has the other end side thereof, the other end side of the throttle portion is arranged on an extension of the outside path, and
the throttle portion on the outside path is lower than the throttle portion on the inside path in height.

6. The air flow rate measuring device according to claim 5, wherein the throttle portion is in a tapered shape that decreases in height from the one end side toward the other end side.

7. The air flow rate measuring device according to claim 5, wherein the throttle portion is in an R shape that decreases in height from the one end side toward the other end side.

8. The air flow rate measuring device according to claim 5, wherein the throttle portion stepwisely decreases in height from the one end side toward the other end side.

9. The air flow rate measuring device according to claim 1, wherein the center portion is located in the vicinity of the peak of the flow velocity distribution when the air flow rate is lower than predetermined flow rate.

10. An air flow rate measuring device comprising:
a bypass passage through which air flowing in an air passage is capable of partially flowing; and
a heater element that is arranged in the bypass passage, the heater element measuring an air flow rate on the basis of a quantity of heat, which is radiated to air,
wherein the bypass passage defines an inlet, an inflow passage, and an outflow passage,
the inlet opens in a direction that is opposite to a flow direction of air flowing through the air passage such that air flowing through the inlet bends to be in a predetermined flow direction and flows into the inflow passage,
the outflow passage connects to the inflow passage via a bent portion in which air flowing from the inflow passage further changes in flow direction,
the heater element is arranged in the inflow passage,
the heater element is arranged such that a lengthwise direction of the heater element is substantially in parallel with a flow direction of air flowing through the air passage; and
a throttle portion that is provided to a side face of the inflow passage, the side face of the inflow passage being perpendicular to the lengthwise direction of the heater element,
wherein the throttle portion gradually reduces the inflow passage in cross section from an upstream of a region, in which the heater element is arranged, toward the region, in which the heater element is arranged,
the bent portion defines an inside path, in which air flowing from the inlet bends to be in the predetermined flow direction into the inflow passage while decreasing in flow velocity, on an inside within the bent portion,
the bent portion defines an outside path, in which air flowing from the inlet bends to be in the predetermined flow direction into the inflow passage while increasing in flow velocity, on an outside within the bent portion,
the throttle portion has one end side thereof, the one end side of the throttle portion is arranged on an extension of the inside path,
the throttle portion has the other end side thereof, the other end side of the throttle portion is arranged on an extension of the outside path, and
the throttle portion on the outside path is lower than the throttle portion on the inside path in height.

11. The air flow rate measuring device according to claim 10, wherein the throttle portion is in a tapered shape that decreases in height from the one end side toward the other end side.

12. The air flow rate measuring device according to claim 10, wherein the throttle portion is in an R shape that decreases in height from the one end side toward the other end side.

13. The air flow rate measuring device according to claim 10, wherein the throttle portion stepwisely decreases in height from the one end side toward the other end side.

* * * * *